(12) United States Patent
McCollum et al.

(10) Patent No.: US 8,814,410 B2
(45) Date of Patent: Aug. 26, 2014

(54) LIGHTING ASSEMBLY WITH CONTROLLED CONFIGURABLE LIGHT REDIRECTION

(75) Inventors: Timothy A. McCollum, Avon Lake, OH (US); Fumitomo Hide, San Jose, CA (US); Robert M. Ezell, Brunswick, OH (US)

(73) Assignee: Rambus Delaware LLC, Brecksville, OH (US)

( * ) Notice: Subject to any disclaimer, the term of this patent is extended or adjusted under 35 U.S.C. 154(b) by 89 days.

(21) Appl. No.: 13/542,857

(22) Filed: Jul. 6, 2012

(65) Prior Publication Data

US 2013/0016526 A1 Jan. 17, 2013

Related U.S. Application Data

(60) Provisional application No. 61/507,258, filed on Jul. 13, 2011.

(51) Int. Cl.
*F21V 5/00* (2006.01)
*G09F 13/18* (2006.01)
*G02B 3/00* (2006.01)
*G02B 5/04* (2006.01)

(52) U.S. Cl.
CPC ............... *G02B 3/0068* (2013.01); *G09F 13/18* (2013.01); *G02B 6/0036* (2013.01); *G02B 3/0056* (2013.01); *G02B 6/006* (2013.01); *G02B 6/0053* (2013.01); *G02B 5/045* (2013.01)
USPC ............ 362/607; 362/268; 362/331; 362/619

(58) Field of Classification Search
USPC ......... 362/606, 607, 268, 293, 616, 619, 331; 349/57
See application file for complete search history.

(56) References Cited

U.S. PATENT DOCUMENTS 4,487,481 A   12/1984   Suzawa
4,618,216 A   10/1986   Suzawa
4,642,736 A    2/1987   Masuzawa et al.

(Continued)

FOREIGN PATENT DOCUMENTS

KR   10-2010-038840 A   4/2010
KR      10-0961043 B1   6/2010

OTHER PUBLICATIONS

Notification of Transmittal of the ISR and Written Opinion of the ISA dated Jan. 31, 2013, re PCT/US2012/045898. 12 pages.

*Primary Examiner* — Peggy Neils
(74) *Attorney, Agent, or Firm* — Renner, Otto, Boisselle & Sklar, LLP

(57) ABSTRACT

A lighting assembly has an edge-lit light guide having a light output surface through which light is extracted by light extracting optical elements. The extracted light has a maximum intensity at low light ray angles relative to the light output surface. A light redirecting member has an arrangement of light redirecting optical elements configured to redirect the extracted light incident thereon to provide a pattern of redirected light. A light focusing member has light focusing optical elements having an angular acceptance range. The redirected light has light ray angles within the angular acceptance range of the light focusing optical elements and is perceived as a pattern of light. The extracted light not redirected by the light redirecting member has light ray angles outside the angular acceptance range of the light focusing optical elements and is not perceived, or is perceived as background light.

38 Claims, 4 Drawing Sheets

(56) References Cited

U.S. PATENT DOCUMENTS

| | | | | |
|---|---|---|---|---|
| 5,040,098 | A | 8/1991 | Tanaka et al. | |
| 5,046,826 | A | 9/1991 | Iwamoto et al. | |
| 5,057,974 | A | 10/1991 | Mizobe | |
| 5,359,691 | A | 10/1994 | Tai et al. | |
| 5,414,599 | A | 5/1995 | Kaneko et al. | |
| 5,418,631 | A | 5/1995 | Tedesco | |
| 5,528,720 | A | 6/1996 | Winston et al. | |
| 6,167,182 | A | 12/2000 | Shinohara et al. | |
| 6,905,220 | B2 * | 6/2005 | Wortman et al. | 362/627 |
| 7,186,014 | B2 * | 3/2007 | Shimura | 362/606 |
| 7,665,876 | B2 * | 2/2010 | Taya et al. | 362/607 |
| 7,824,093 | B2 * | 11/2010 | Kim et al. | 362/626 |
| 7,845,839 | B2 * | 12/2010 | Collier | 362/606 |
| 8,033,706 | B1 * | 10/2011 | Kelly et al. | 362/607 |
| 8,085,364 | B2 * | 12/2011 | Travis | 349/95 |
| 8,545,062 | B2 * | 10/2013 | Lin et al. | 362/339 |
| 2005/0276071 | A1 * | 12/2005 | Sasagawa et al. | 362/607 |
| 2007/0110386 | A1 | 5/2007 | Chiang | |
| 2008/0049447 | A1 | 2/2008 | Jung | |
| 2008/0144333 | A1 * | 6/2008 | Gourlay | 362/609 |
| 2008/0304283 | A1 * | 12/2008 | Parker et al. | 362/607 |
| 2011/0058389 | A1 * | 3/2011 | Shiau et al. | 362/607 |

\* cited by examiner

LIGHTING ASSEMBLY WITH CONTROLLED CONFIGURABLE LIGHT REDIRECTION

CROSS-REFERENCE TO RELATED APPLICATIONS

This application claims the benefit of U.S. Provisional Application Ser. No. 61/507,258, filed Jul. 13, 2011, the entire disclosure of which is incorporated herein by reference.

BACKGROUND

It is known to use edge-lit lighting assemblies in the area of general and architectural lighting applications. In such applications, it may be desirable to use controlled and configurable light redirection to produce the perception of depth in a pattern of light. This may be done, for example, to add a perception of depth to an image such as a design, logo, text or other information or artistic effect into general or architectural lighting applications.

DETAILED DESCRIPTION

Figure 1:
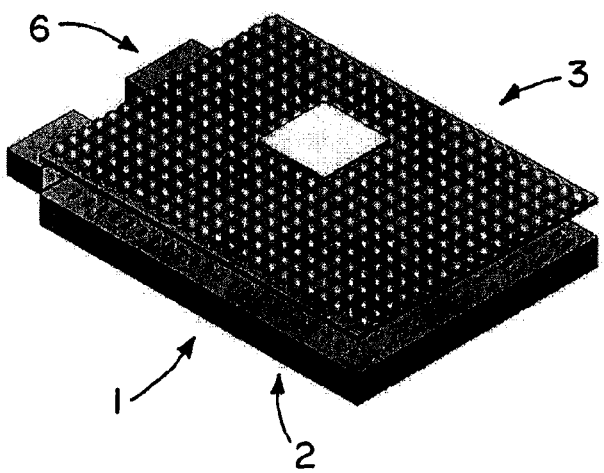
FIG. 1 is a schematic perspective view of one exemplary lighting assembly embodiment.

The embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combinations with or instead of the features of the other embodiments.

As described in greater detail below, the lighting assembly uses controlled and configurable light redirection to provide the perception of depth in a given pattern of light. In an example, this can be used to add a perception of depth to a pattern of light configured as a design, logo, text or other information, or as an artistic effect, for example, in general or architectural lighting applications.

The lighting assembly comprises an edge-lit light guide, a light redirecting member positioned adjacent the light output surface of the light guide, and a light focusing member positioned adjacent the light redirecting member, remote from the light guide. Light extracting optical elements at the light guide extract light from the light guide through the light output surface of the light guide. The extracted light is directed away from the light source and the light output surface and has a maximum intensity at low light ray angles relative to the light output surface. The light redirecting member has an arrangement of light redirecting optical elements configured to redirect the extracted light incident thereon to provide a pattern of redirected light. The light focusing member has light focusing optical elements having an angular acceptance range. The redirected light has light ray angles within the angular acceptance range of the light focusing optical elements. The extracted light not redirected by the light redirecting member has light ray angles outside the acceptance range of the light focusing optical elements.

The light not redirected by the light redirecting member into the acceptance angle range of the light focusing member is not focused by the light focusing optical elements and is therefore not perceived by an observer, or is perceived as a diffuse background light. The light redirected by the light redirecting member into the acceptance angle range of the light focusing member is focused by each of the light focusing optical elements into a respective image originating at the light source. The light collectively redirected by the light redirecting optical elements of the light redirecting member and focused by the light focusing member is perceived by the observer as a pattern of light whose configuration is defined by the arrangement of the light redirecting optical elements. The pattern of light is configured as a design, logo, text or other information, or as an artistic effect, for example, and is perceived as offset in depth from the lighting assembly.

Figure 2:
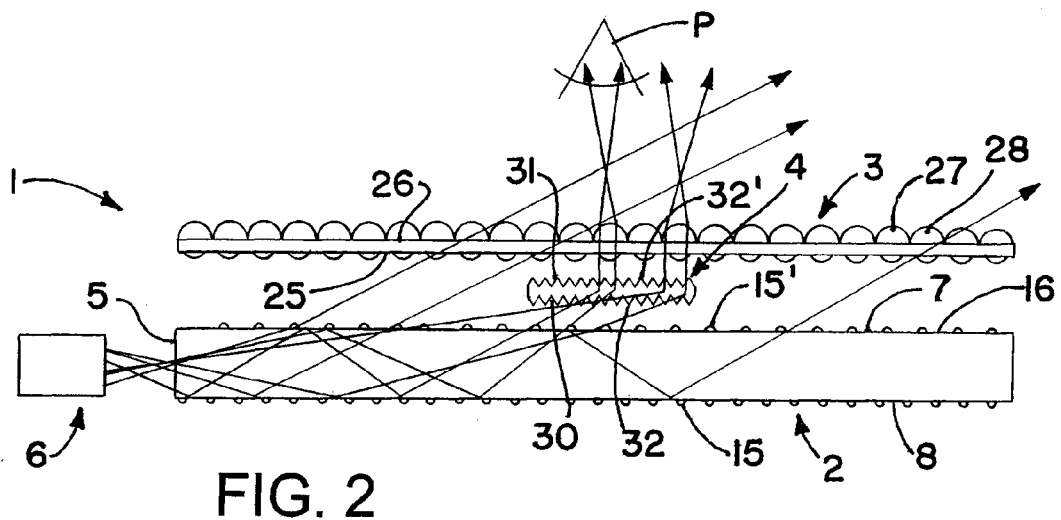
FIG. 2 is an enlarged schematic side view of the lighting assembly of FIG. 1.

Referring now in detail to the drawings and initially to FIGS. 1 and 2, there is schematically shown an example of a lighting assembly embodiment 1 having a light guide 2, a light focusing member 3 and a light redirecting member 4. The light guide 2 is a solid article made from, for example, acrylic, polycarbonate, glass or other appropriate material. The light guide has a light input edge 5 to which a light source 6 is optically coupled to edge light the light guide. The light propagates along the light guide by total internal reflection. For purposes of this disclosure, any surface of the light guide through which light from the light source enters the light guide is considered a light input edge, even if it is located on one of the opposed major surfaces 7 and 8 of the light guide, or forms part of a light turning and/or homogenizing structure to introduce light into the light guide in a manner that allows the light to propagate along the light guide by total internal reflection at the opposed major surfaces of the light guide.

An arrangement of light extracting optical elements 15 or 15' is provided in or on one or both major surfaces 7 and 8 of the light guide 2 for extracting light from the light guide through one of the major surfaces of the light guide (herein-after referred to as the light output surface 16). The light extracting optical elements 15 or 15' are configured to extract light directed away from the light source 6 and the light output surface 16 and having a maximum intensity at low light ray angles relative to the light output surface. The light extracted from the light guide through the light output surface will be referred to herein as extracted light. In one example, the maximum intensity of the extracted light is at light ray angles less than 45° relative to the light output surface 16.

Figure 3:
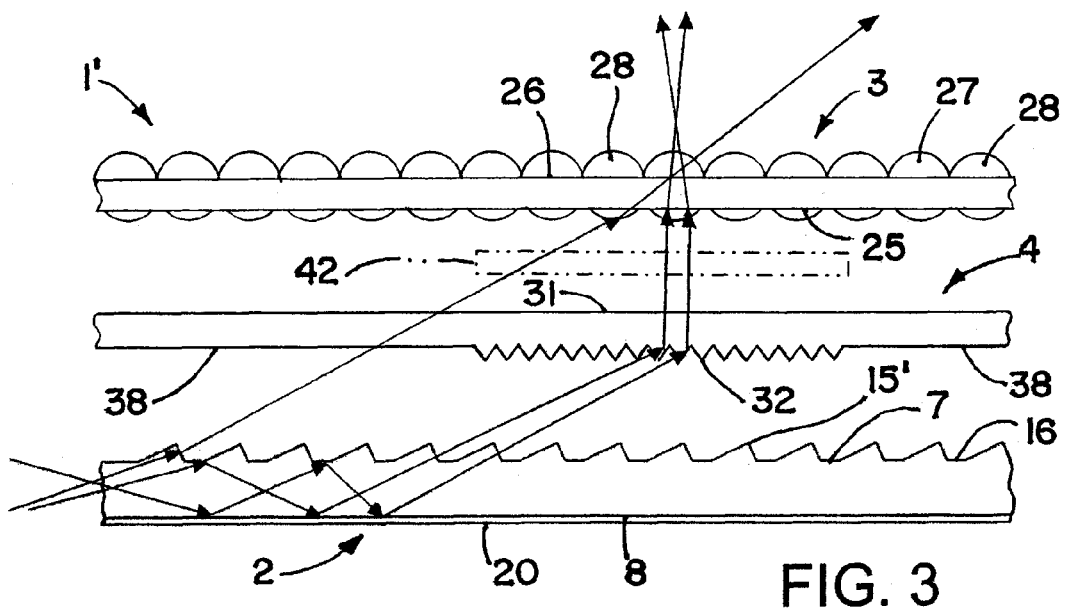
FIG. 3 is a further enlarged schematic fragmentary side view of another exemplary lighting assembly embodiment.
Figure 4:
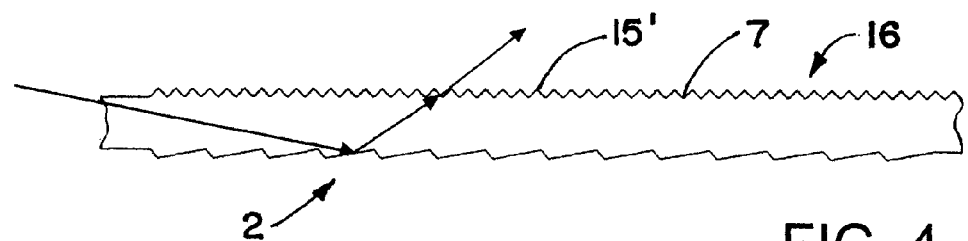
FIG. 4 is an enlarged schematic fragmentary side view of an exemplary light guide usable with any of the exemplary lighting assembly embodiments.

In the examples shown in FIGS. 2 and 4, light extracting optical elements 15 and 15' are in or on both major surfaces 7 and 8 of the light guide 2. In another example shown in FIG. 3, light extracting optical elements 15' are in or on one of the major surfaces 7 and 8 of the light guide. Light extracting optical elements that are in or on a major surface will be referred to as being "at" the major surface.

Each light extracting optical element 15 or 15' functions to disrupt the total internal reflection of the propagating light that is incident thereon to reflect light toward the light output surface 16 so that the light exits the light guide through the light output surface or to transmit light through the light extracting optical elements and out the light output surface. A reflective element 20 may be provided at or adjacent the major surface 8 of the light guide 2 opposite the light output surface 16 as schematically shown in FIG. 3 for reflecting light towards the light output surface of the light guide.

Exemplary light extracting optical elements include prismatic elements, lenticular elements, and features of well defined shape that are small relative to the linear dimensions of the major surfaces of the light guide, which are sometimes referred to as micro-optical elements. The smaller of the length and width of a micro-optical element is less than one-tenth of the longer of the length and width of the light guide, and the larger of the length and width of the micro-optical element is less than one-half of the smaller of the length and width of the light guide. The length and width of the micro-optical element are measured in a plane parallel to the major surface of the light guide for flat light guides and along a surface contour for non-flat light guides.

Micro-optical elements are shaped to predictably reflect light or predictably refract light. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, and index of refraction to provide a desired light output from the light guide 2.

The exemplary light guides 2 shown in FIGS. 2 and 3, having light extracting optical elements at one or both major surfaces, are typically formed by a process such as stamping, molding, embossing, extruding, laser etching, chemical etching, or other suitable process. Light extracting optical elements may also be produced by depositing elements of curable material on the light guides and curing the deposited material using heat, UV light or other radiation. The curable material can be deposited by a process such as printing, inkjet printing, screen printing or other suitable process.

The light guides may be comprised of a single optical material which may be rigid or flexible or be comprised of multiple layers of materials of different indices of refraction and may optionally contain light-extracting optical elements at the surface of one or more of the layers adjacent another of the layers. Also the light guides may contain particles with different indices of refraction than that of the light guides and/or may contain voids for scattering light.

The light source 6 may be of any suitable type. Examples of light sources include one or more solid-state light emitters, arc lamps, incandescent bulbs, lens end bulbs, line lights, halogen lamps, neon bulbs, cold cathode fluorescent lamps, fiber optic light pipes transmitting from a remote source, or other suitable light sources. Examples of solid-state light emitters include light-emitting diodes (LEDs), laser diodes, and organic LEDs. The solid-state light emitters may have a top-fire or side-fire configuration. The solid-state light emitters may be broad spectrum solid-state light emitters (e.g., emit white light), solid-state light emitters that emit light of a desired color or spectrum (e.g., red light, green light, blue light, or ultraviolet light), or a mixture of broad-spectrum solid-state light emitters and solid-state light emitters that emit light of a desired color or spectrum.

In the exemplary lighting assemblies 1 and 1' shown in FIGS. 2 and 3, the light focusing member 3 is in close proximity to the light output surface 16 of the light guide 2 and is oriented substantially parallel to the light output surface of the light guide. The light focusing member 3 has a light entrance surface 25 facing the light output surface 16 of the light guide and a light exit surface 26 opposite the light entrance surface. At least one of the surfaces 25 and 26 of the light focusing member 3 comprises a pattern of light focusing optical elements 27 having an angular acceptance range such that the light ray angles of the extracted light are outside the angular acceptance range of the light focusing optical elements 27. The angular acceptance range of the light focusing member 3 is a range of angles of incidence within which light incident on the light focusing member is focused within a defined region by the light focusing optical elements 27. In the example shown in FIG. 2, the angular acceptance range is defined with respect to a region in which an observer P is located.

In certain examples shown in FIGS. 2, 3, 6, 7, 8A and 8B, the light focusing optical elements 27 comprise aligned lens components on the opposed surfaces 25 and 26 of the light focusing member 3, the lens components collectively constituting spherical or aspherical lenses 28. However, the light focusing optical elements need not be spherical or aspherical. In the example shown in FIG. 9, the light focusing optical elements 27 are hemispherical lenses 29. In another example, the light focusing optical elements 27 are cylindrical lenses or semi-cylindrical lenses (not shown) each having an axis parallel to the light input edge 5 of the light guide 2. The cylindrical lenses comprise aligned lens components on the opposed surfaces 25 and 26 of the light focusing member 3. The light focusing optical elements may be at both the light exit surface 26 and the light entrance surface 25 of the light focusing member. The light focusing optical elements at the light exit surface and the light focusing optical elements at the light entrance surface of the light focusing member 3 are aligned in a plane parallel to the light entrance surface 25. In other examples, the light focusing optical elements comprise surfaces defined by n-th order polynomial. The size of the light focusing optical elements 27 in a plane parallel to the light entrance surface 25 defines the spatial resolution of the pattern of light that results when the light focusing optical elements focus the light redirected by the arrangement of light redirecting optical elements.

Light redirecting member 4 is positioned between the light focusing member 3 and the light guide 2. The light redirecting member 4 has a first major surface 30 facing the light guide 2 and a second major surface 31 facing the light focusing member 3. At least one of the major surfaces 30 and 31 of the light redirecting member 4 has an arrangement of light redirecting optical elements 32 configured to redirect the extracted light incident thereon into the angular acceptance range of the light focusing optical elements 27 of the light focusing member 3.

The light that is redirected by the arrangement of light redirecting optical elements will be referred to herein as redirected light. Each light focusing optical element 27 of the light focusing member 3 focuses the redirected light incident thereon into a respective image originating at the light source 6. The redirected light collectively focused by the light focusing optical elements 27 is perceived by the observer as a pattern of light whose configuration is defined by the arrangement of the light redirecting optical elements 32.

Figure 5:
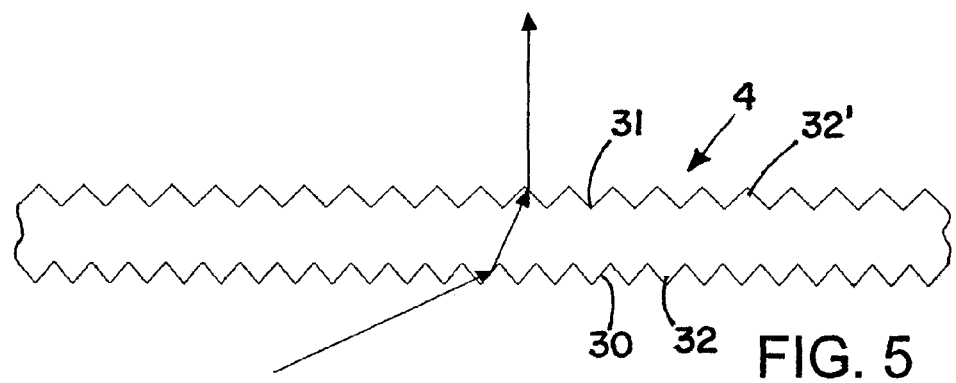
FIG. 5 is an enlarged schematic fragmentary side view of an exemplary light redirecting member usable with any of the exemplary lighting assembly embodiments.
Figure 6:
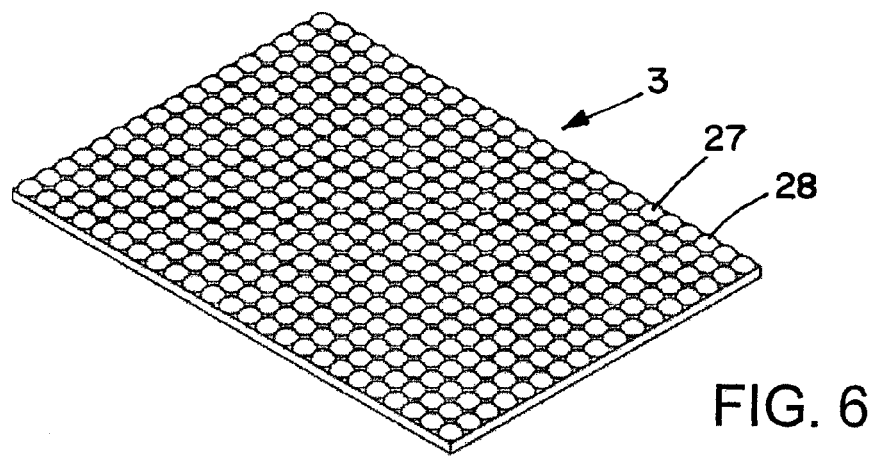
FIG. 6 is a top perspective view of an exemplary light focusing member usable with any of the exemplary lighting assembly embodiments.
Figure 7:
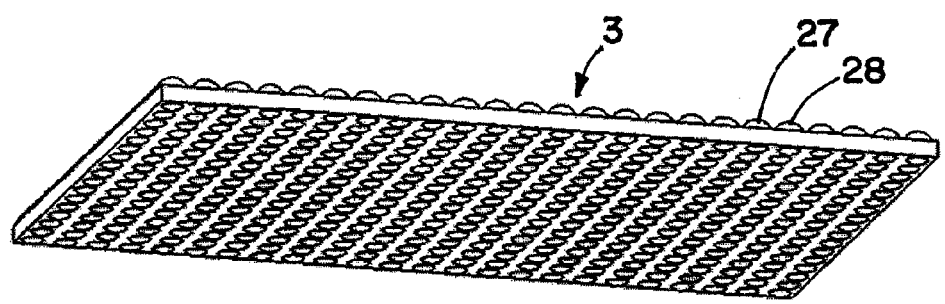
FIG. 7 is a bottom perspective view of the exemplary light focusing member of FIG. 6.

The light redirecting optical elements 32 are in or on at least one of the major surfaces 30 and 31 of the light redirecting member 4. Light redirecting optical elements that are in or on a major surface will be referred to as being "at" the major surface. The examples of FIGS. 2 and 5 show light redirecting optical elements 32 and 32' at both major surfaces of the light redirecting member. The example of FIG. 3 shows light redirecting optical elements 32 at one of the major surfaces 30 of the light redirecting member.

Exemplary light redirecting optical elements 32 and 32' include features of well-defined shape, such as lenticular elements and lenticular grooves and features of well-defined shape that are small relative to the linear dimensions of the surfaces, which are sometimes referred to as micro-optical elements. The smaller of the length and width of the micro-optical elements 32 and 32', like the micro-optical elements 15 and 15' previously described, is less than one-tenth of the longer of the length and width of the arrangement of light redirecting optical elements, and the larger of the length and width of the micro-optical elements 32 and 32' is less than one-half of the smaller of the length and width of the arrangement of light redirecting optical elements. The length and width of the micro-optical elements is measured in a plane parallel to the major surface of the light redirecting member for flat light redirecting members and along a surface contour for non-flat light redirecting members.

In some embodiments of lighting assembly 1 or 1', light redirecting optical elements configured as micro-optical elements are typically small in size compared with the light focusing optical elements of light focusing member 3. In an example, the linear dimensions of the light redirecting optical elements are less than one-third of the linear dimensions of the light focusing optical elements. In another example, the linear dimensions of the light redirecting optical elements are less than one-tenth of the linear dimensions of the light focusing optical elements. In other embodiments, the light redirecting optical elements configured as micro-optical elements are comparable in size with the light focusing optical elements and are aligned with the light focusing optical elements in a plane parallel to the major surfaces 30 and 31 of the light redirecting member 4. In other embodiments, the light redirecting optical elements are highly elongate in a direction parallel to the light input edge 5, and are small in size compared to, or comparable in size with, the light focusing optical elements of the light focusing member in a direction orthogonal to the light input edge.

In the example of FIG. 2, an observer P is shown viewing the focused light through the light exit surface 26 of the light focusing member 3 at an angle that is close to normal to the light output surface 16 of the light guide. However, the light redirecting optical elements 32 and 32' of the light redirecting member 4 could be configured so that the focused light could be viewed by the observer at another angle as long as the light redirecting member 4 directs the redirected light towards the observer and the redirected light is incident on the light focusing optical elements 27 of the light focusing member 3 within the angular acceptance range of the light focusing optical elements.

The light redirecting optical elements 32 and 32' are configured to redirect light such that an observer viewing the focused light output from the light focusing member 3 perceives a pattern of light configured as a design, logo, text or other information, or as an artistic effect, for example. The configuration of the pattern of light depends on the arrangement of the light redirecting optical elements 32. 32' of the light redirecting member 4.

The distance from the light focusing member 3 of the region where the light focusing optical elements 27 focus the redirected light depends on the focal length of the light focusing optical elements and the optical path length between the light source 6 and the light focusing member. The focal length of the light focusing optical elements depends on the index of refraction of the material of the light focusing optical elements and the geometry of the light focusing optical elements.

In the example of FIG. 2, the light redirecting member 4 spans only a portion of the light output surface 16 of the light guide 2 spanned by the light focusing member 3. A portion of the extracted light is incident on the arrangement of light redirecting optical elements 32 and is redirected into the angular acceptance range of the light focusing member 3. This portion of the extracted light is therefore focused at the location of the observer P by the light focusing member and is perceived by the observer. Another portion, typically the remainder, of the extracted light is not incident on the light redirecting optical elements 32 of the light redirecting member 4 and is therefore not redirected by the light redirecting member. This portion of the extracted light is incident on the light focusing member 3 at an angle of incidence outside the angular acceptance range of the light focusing member and is not focused by the light focusing member at the location of the observer P and is perceived by the observer as a diffuse background light or may not be perceived at all.

To the observer P, the pattern of light resulting from focusing the redirected portion of the extracted light appears to originate from an image plane produced by the light focusing optical elements 27, whereas the background light, if any, appears to originate from lighting assembly 1, specifically, from the surface of one of the light guide 2, the light redirecting member 4 and the light focusing member 3. The image plane is located at a distance from the observer determined by the focal properties of the light focusing optical elements 27 and the optical path length from the light source 6 to the light focusing member 3. The pattern of light is therefore perceived by the observer offset in depth from the lighting assembly 1. The offset may be away from or towards the observer. Depth is a direction orthogonal to the major surfaces 7 and 8 of the light guide 2.

In the example of FIG. 3, the light guide 2, the light redirecting member 4 and the light focusing member 3 are substantially equal in area and the arrangement of light redirecting optical elements 32 occupies less than all of the area of the light redirecting member 4. In this example, and as will be described in greater detail below with reference to FIGS. 11 and 12, the area 38 of the light redirecting member 4 surrounding the arrangement of light redirecting optical elements 32 and/or 32' includes diffusers (not shown in FIG. 3) to provide diffuse background light around the pattern of light redirected by the arrangement of light redirecting optical elements and focused by the light focusing member 3.

Figure 8A:
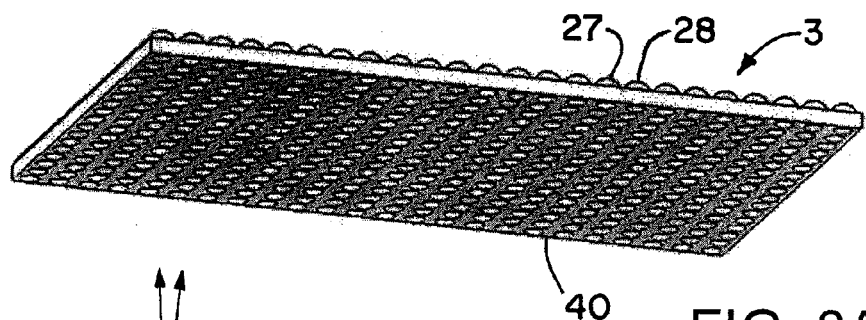
FIG. 8A is a bottom perspective view of another exemplary light focusing member usable with any of the exemplary lighting assembly embodiments.
Figure 9:
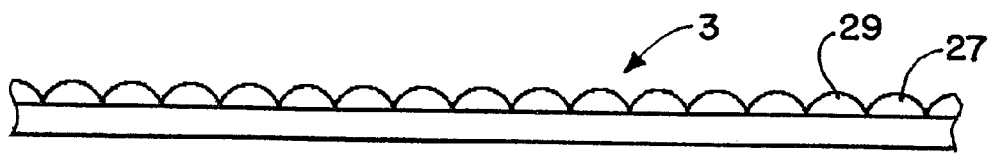
FIG. 9 is an enlarged schematic fragmentary side view of another exemplary light focusing member usable with any of the exemplary lighting assembly embodiments.

In another example shown in FIG. 8A, portions of the light entrance surface 25 of the light focusing member 3 facing the light redirecting member 4 between the light focusing optical elements 27 are made optically non-transmissive to create a higher contrast ratio between the pattern of light and the background light when viewed through the light focusing optical elements. The non-transmissive surface additionally provides a strong local reference against which the observer can judge the depth of the pattern of light. The portions of the light entrance surface between the light focusing optical elements can be made optically non-transmissive by a reflective or absorptive coating 40 applied thereto.

Figure 8B:
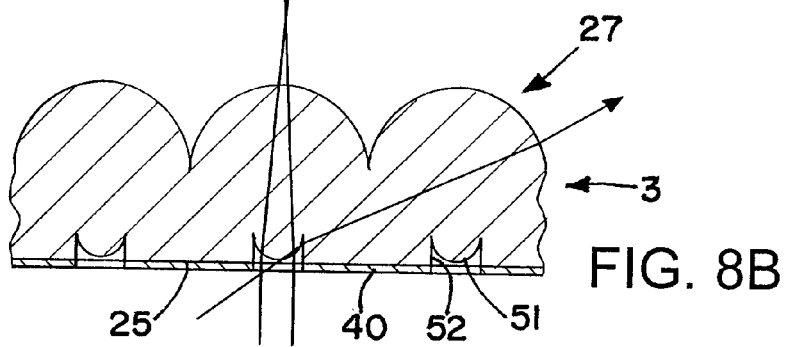
FIG. 8B is a cross-sectional view of a portion of another exemplary light focusing member usable with any of the exemplary lighting assembly embodiments.

In another example shown in FIG. 8B, application of the reflective or absorptive coating 40 to the light entrance surface 25 of the light focusing member 3 is facilitated by locating the portion 51 of each light focusing optical element 27 facing the light guide 2 in a respective recess 52. Each recess 52 is sufficiently deep to accommodate the entire portion 51 of the light focusing optical element 27. As a result, the light entrance surface 25 is substantially planar. This allows the coating 40 to be applied to the light entrance surface 25 between the light focusing optical elements 27 by a process such as screen printing. Examples of other application processes that may be used to apply the coating 40 to the light entrance surface 25, but not to light focusing optical elements 27, include spraying or depositing the coating at a low angle relative to the light entrance surface 25. In addition to depositing the coating 40 on the light entrance surface 25, such processes deposit some coating 40 on the walls of the recess 52, but do not deposit coating 40 on the portions 51 of the light focusing optical elements 27.

Figure 10:
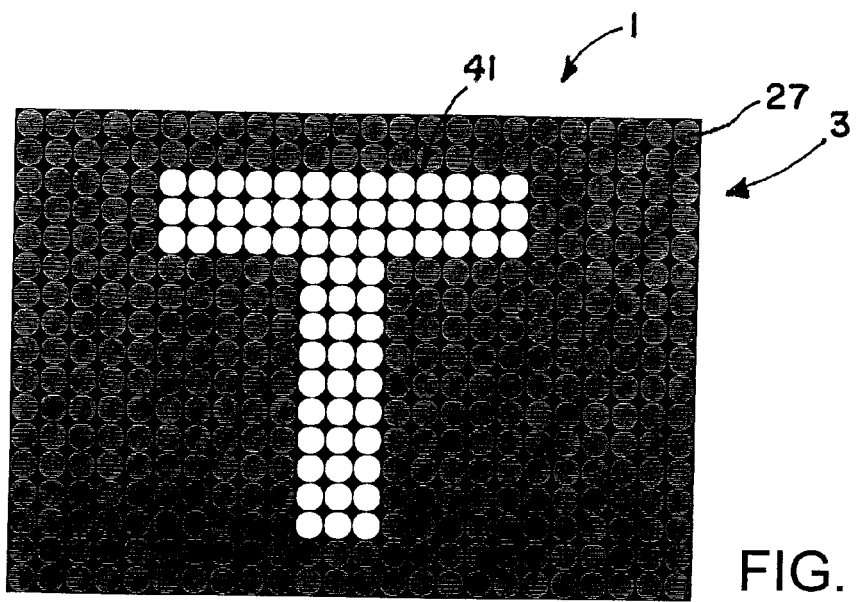
FIG. 10 is an enlarged schematic plan view of any of the exemplary lighting assembly embodiments illustrating an exemplary perception of an image in a given pattern of the light focusing member of the lighting assembly when viewed through the light exit surface of the light focusing member.

In another example, interchangeable light redirecting members 4 are provided. Each of the light redirecting members has a different arrangement of light redirecting optical elements configured to redirect a portion of the extracted light into the angular acceptance range of the light focusing optical elements such that the redirected light focused by the light focusing member is perceived as a respective pattern of light whose configuration depends on the particular arrangement of the light redirecting optical elements of the light redirecting member in the assembly. In this example, the light redirecting member 4 is removably coupled to the lighting assembly for ease of replacement of one light redirecting member with another light redirecting member to add the perception of depth to different patterns of light configured as a design, logo, text or other information, or as an artistic effect, for example. One such pattern of light 41 is shown in FIG. 10.

In another example, a color filter 42 is interposed between the arrangement of light redirecting optical elements 32 of the light redirecting member 4 and the light focusing member 3, as schematically shown in phantom lines in FIG. 3, to change the color of the pattern of light focused by the light focusing member 3 relative to the background light. The color filter may alternatively be located between the arrangement of light redirecting optical elements 32 of the light redirecting member 4 and the light output surface 16 of the light guide 2. A color filter (not shown) may additionally or alternatively be located in the area 38 of the light redirecting member 4 outside the arrangement of light redirecting optical elements 32 to change the color of the background light.

In another example, the light focusing member and the light redirecting member are integral. In this example, the light focusing member and the light redirecting member share a common substrate (not shown), with the light redirecting optical elements and the light focusing optical elements at opposite surfaces of the common substrate. In this example, the light redirecting optical elements and the light focusing optical elements may be aligned in the plane of a surface of the substrate.

Figure 11:
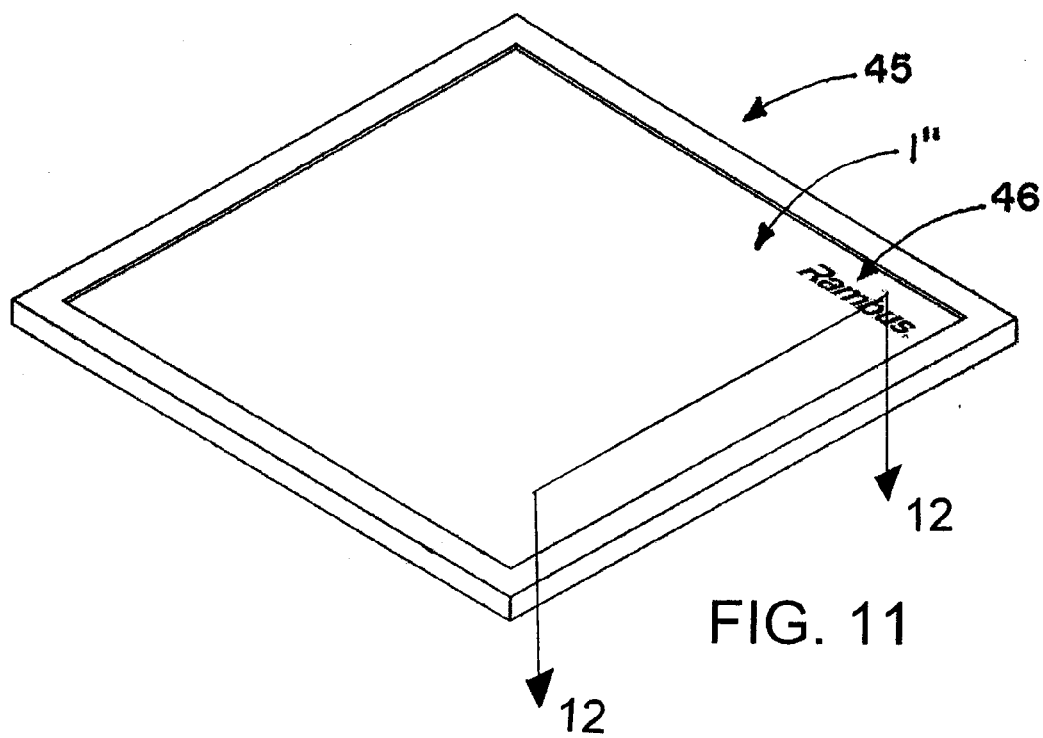
FIG. 11 is a schematic perspective view of an exemplary lighting fixture incorporating an exemplary lighting assembly.
Figure 12:
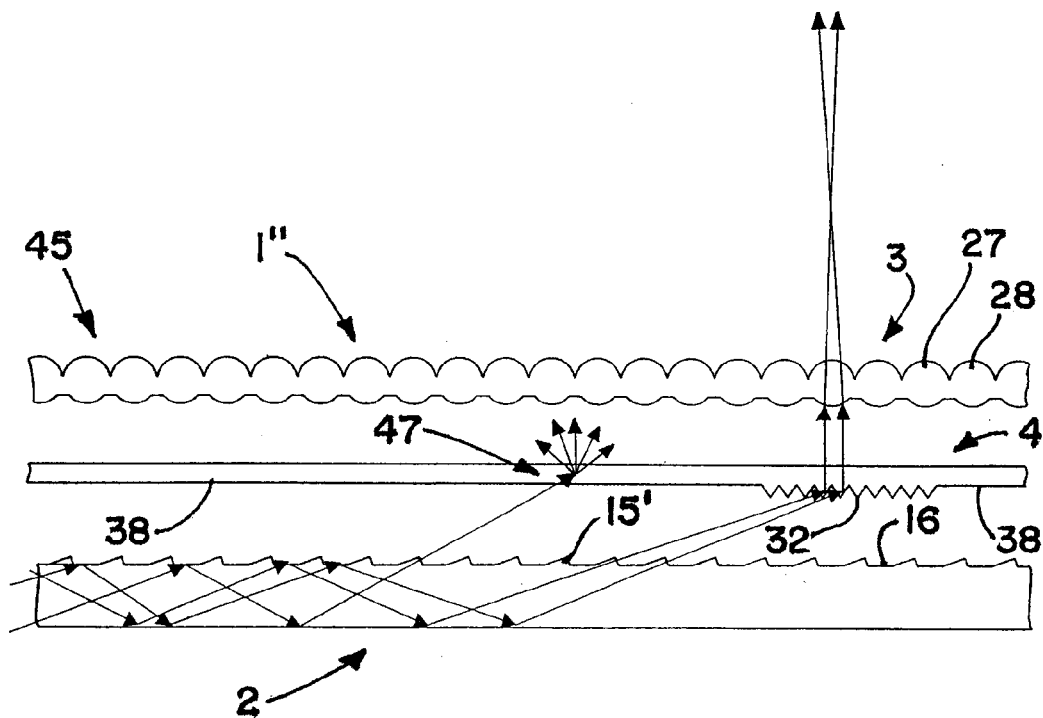
FIG. 12 is an enlarged schematic fragmentary section through the lighting assembly of the lighting fixture of FIG. 11 taken on the plane of the line 12-12 thereof.

In another example, shown in FIGS. 11 and 12, a lighting assembly 1″ is part of a larger lighting fixture 45 that shares the light guide 2 of the lighting assembly. In this example, the light guide 2, the light redirecting member 4 and the light focusing member 3 are substantially equal in area. However, the arrangement of light redirecting optical elements 32 at the light redirecting member 4 is small in area compared with the light output surface 16 of the light guide such that the light redirecting optical elements redirect a small portion of the extracted light from the light guide 2 into the angular acceptance range of the light focusing optical elements 27. The light redirecting optical elements are configured to redirect the extracted light such that the redirected light passing through the light focusing member is perceived as a pattern of light 46 configured the brand of the lighting fixture, or a logo, design, text or other information, or as an artistic effect depending on the particular arrangement of light redirecting optical elements of the light redirecting member in the lighting assembly. The larger area 38 of the light redirecting member 4 surrounding the arrangement of light redirecting optical elements 32 includes diffusers 47 to provide a diffuse light output from the lighting fixture. Some of the light scattered by the diffusers 47 is focused by the light focusing member 3 but is perceived by the observer as originating at the light redirecting member and is therefore perceived as being at a different depth than the pattern of light. Other of the light scattered by the diffusers 47 passes through the light focusing member 3 without being focused by the light focusing optical elements 27 and contributes to the background light.

In some embodiments of the lighting assembly 1″, a border devoid of diffusers 47 is interposed between the arrangement of light redirecting optical elements 32 and the larger area 38 of the light redirecting member 4. With this arrangement, a region of reduced brightness is perceived between the pattern of light and the light output from the larger area 38.

The arrangement of light redirecting optical elements typically includes one or more regions devoid of light redirecting optical elements. Extracted light incident on such regions is not redirected so that such regions produce corresponding lower-brightness areas in the pattern of light generated by the arrangement of light redirecting optical elements. In some embodiments of the lighting assemblies 1, 1′ and 1″, diffusers 47 are located in the regions devoid of light redirecting optical elements within the arrangement of light redirecting optical elements. Such diffusers increase the brightness of the lower-brightness areas in the pattern of light.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

Although this disclosure has described certain embodiments, equivalent alterations and modifications will become apparent upon the reading and understanding of the specification. In particular, with regard to the various functions performed by the above-described components, the terms used to describe such components are intended to correspond, unless otherwise indicated, to any component which performs the specified function of the described component (e.g., that is functionally equivalent), even though not structurally equivalent to the exemplary embodiments. In addition, while a particular feature may have been disclosed with respect to only one embodiment, such feature may be combined with one or more other features as may be desired and advantageous for any given or particular application.

What is claimed is:

1. A lighting assembly for producing a pattern of light providing a perception of depth, comprising:

a light guide having a light output surface;

a light source to edge light the light guide, the light propagating along the light guide by total internal reflection;

light extracting optical elements at the light guide for extracting light from the light guide through the light output surface as extracted light, the extracted light directed away from the light source and the light output surface and having a maximum intensity at low light ray angles relative to the light output surface;

a light redirecting member positioned adjacent the light output surface of the light guide, the light redirecting member comprising an arrangement of light redirecting optical elements that defines the pattern of light, the light redirecting optical elements configured to redirect the extracted light incident thereon to provide redirected light; and a light focusing member positioned adjacent the light redirecting member, remote from the light guide, the light focusing member comprising light focusing optical elements having an angular acceptance range, the redirected light having light ray angles within the angular acceptance range of the light focusing optical elements that is focused within a defined region by the light focusing optical elements, the extracted light not redirected by the light redirecting optical elements having light ray angles outside the acceptance range of the light focusing optical elements.

2. The lighting assembly of claim 1, wherein the light extracting optical elements are micro-optical elements.

3. The lighting assembly of claim 1, wherein the light focusing member is substantially parallel to the light output surface of the light guide.

4. The lighting assembly of claim 1, wherein the light extracting optical elements are configured to extract light at light ray angles less than 45° relative to the light output surface.

5. The lighting assembly of claim 4, wherein the light redirecting optical elements are configured to redirect the extracted light incident thereon toward a direction normal to the light output surface.

6. The lighting assembly of claim 1, wherein the light redirecting member spans only a portion of the light output surface of the light guide spanned by the light focusing member.

7. The lighting assembly of claim 1, wherein the arrangement of light redirecting optical elements occupies less than all of the area of the light redirecting member.

8. The lighting assembly of claim 7, wherein the light redirecting member additionally comprises diffusers surrounding the arrangement of light redirecting optical elements.

9. The lighting assembly of claim 7, wherein the light redirecting member additionally comprises diffusers within the arrangement of light redirecting optical elements.

10. The lighting assembly of claim 1, wherein the light source comprises a solid-state light source.

11. The lighting assembly of claim 1, wherein the light redirecting member has a first major surface facing the light guide and a second major surface facing the light focusing member, and the light redirecting optical elements are at one or both of the major surfaces of the light redirecting member.

12. The lighting assembly of claim 1, wherein the light redirecting optical elements are micro-optical elements, lenticular elements, or prismatic elements.

13. The lighting assembly of claim 1, wherein at least some of the extracted light that is not redirected by the light redirecting member provides background light around the redirected light passing through the light focusing member.

14. The lighting assembly of claim 13, further comprising a color filter to change the color of the redirected light relative to the background light.

15. The lighting assembly of claim 1, wherein the arrangement of light redirecting optical elements is configured to define the pattern of light formed by the redirected light after passing through the light focusing member.

16. The lighting assembly of claim 1, wherein the light focusing optical elements comprise spherical lenses.

17. The lighting assembly of claim 1, wherein the light focusing optical elements comprise hemispherical lenses.

18. The lighting assembly of claim 1, wherein the light focusing optical elements comprise aspheric lenses.

19. The lighting assembly of claim 1, wherein the light focusing optical elements comprise surfaces defined by n-th order polynomial.

20. The lighting assembly of claim 1, wherein the light focusing optical elements comprise cylindrical lens portions having axes orthogonal to the direction of light propagation through the light guide.

21. The lighting assembly of claim 1, wherein the light focusing member has a light entrance surface facing the light redirecting member and the light output surface of the light guide, the light entrance surface having a reflective or absorptive coating on areas between the light focusing optical elements to create a higher contrast ratio between the focused light and the non-focused light.

22. The lighting assembly of claim 1, wherein the light focusing optical elements comprise first lens portions at a surface of the light focusing member facing the light guide, and second lens portions, aligned with corresponding ones of the first lens portions, at a surface of the light focusing member remote from the light guide.

23. The lighting assembly of claim 22, wherein the lens portions are portions of spherical lenses.

24. The lighting assembly of claim 22, wherein the lens portions are portions of aspherical lenses.

25. The lighting assembly of claim 1, further comprising interchangeable light redirecting members, at least some of the light redirecting members comprising different arrangements of light redirecting optical elements configured to redirect different portions of the extracted light such that the redirected light focused by the light focusing member produces different patterns of light depending on the arrangement of light redirecting optical elements of the light redirecting member in the lighting assembly.

26. The lighting assembly of claim 1, wherein the light focusing member and the light redirecting member are integral.

27. The lighting assembly of claim 26, wherein the light redirecting optical elements and the light focusing optical elements are at opposite surfaces of a common substrate.

28. The lighting assembly of claim 27, wherein the light redirecting optical elements and the light focusing optical elements are aligned in a plane of a surface of the substrate.

29. The lighting assembly of claim 1, wherein the arrangement of light redirecting optical elements is small in area compared with the light output surface of the light guide.

30. The lighting assembly of claim 1, wherein the light source comprises an array of light emitters.

31. The lighting assembly of claim 1, wherein the light source comprises an LED.

32. The lighting assembly of claim 31, wherein the LED comprises a white LED.

33. A lighting fixture comprising the lighting assembly of claim 1, wherein the light guide of the lighting assembly is shared by the lighting fixture.

34. The lighting fixture of claim 33, wherein the light guide, the light redirecting member and the light focusing member are substantially equal in area.

35. The lighting fixture of claim 34, wherein the arrangement of light redirecting optical elements is small in area compared with the light output surface of the light guide.

36. The lighting fixture of claim 35, wherein the arrangement of light redirecting optical elements is configured to redirect the extracted light such that the redirected light forms a pattern of light after passing through the light focusing member.

37. The lighting fixture of claim 36, wherein the pattern of light is configured as a design, logo, text or other information, or as an artistic effect.

38. The lighting fixture of claim 35, wherein the light redirecting member additionally comprises diffusers surrounding the arrangement of light redirecting optical elements to provide a diffuse light output from the lighting fixture.

\* \* \* \* \*